US011256420B2

(12) United States Patent
Gao et al.

(10) Patent No.: US 11,256,420 B2
(45) Date of Patent: *Feb. 22, 2022

(54) METHOD AND APPARATUS FOR SCALING OUT STORAGE DEVICES AND SCALED-OUT STORAGE DEVICES (71) Applicant: EMC IP Holding Company LLC, Hopkinton, MA (US)

(72) Inventors: Jian Gao, Beijing (CN); Hongpo Gao, Beijing (CN); Geng Han, Beijing (CN); Xinlei Xu, Beijing (CN); Jibing Dong, Beijing (CN)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,451

(22) Filed: Oct. 15, 2019

(65) Prior Publication Data
US 2020/0042188 A1 Feb. 6, 2020

Related U.S. Application Data (63) Continuation of application No. 15/095,969, filed on Apr. 11, 2016, now Pat. No. 10,444,994.

(30) Foreign Application Priority Data

Apr. 17, 2015 (CN) .......................... 2015101842872

(51) Int. Cl.
G06F 12/00 (2006.01)
G06F 13/00 (2006.01)
(Continued)

(52) U.S. Cl.
CPC .......... G06F 3/0607 (2013.01); G06F 3/0629 (2013.01); G06F 3/0689 (2013.01);
(Continued)

(58) Field of Classification Search
CPC .... G06F 3/0605; G06F 3/0607; G06F 3/0629; G06F 13/42
(Continued)

(56) References Cited

U.S. PATENT DOCUMENTS

2006/0230076 A1* 10/2006 Gounares ............ G06F 11/2094
2011/0197024 A1 8/2011 Thomas
2014/0164825 A1* 6/2014 Greanac .............. G06F 11/1088
714/6.24

OTHER PUBLICATIONS

First Office Action issued in Chinese Application No. 2015101842872 dated Jul. 25, 2018.
(Continued)

Primary Examiner — Edward J Dudek, Jr.
Assistant Examiner — Sidney Li
(74) Attorney, Agent, or Firm — Brian J. Colandreo; Mark H. Whittenberger; Holland & Knight LLP (57) ABSTRACT Embodiments of the present disclosure relate to method and apparatus for scaling out storage devices, and scaled-out storage devices by establishing a cross-device link between a first storage device and a second storage device; exchanging configuration information of at least one of the first storage device and the second storage via the cross-device link; creating, in the first storage device, a shadow object corresponding to a real object in the second storage device; and creating, in the second storage device, a shadow object corresponding to a real object in the first storage device; wherein each shadow object can expose feature and/or state of a corresponding real object to users without implementing a functioning logic of the corresponding real object.

18 Claims, 7 Drawing Sheets (51) Int. Cl.
*G06F 13/28* (2006.01)
*G06F 3/06* (2006.01)
*G06F 13/40* (2006.01)
*G06F 13/42* (2006.01)

(52) U.S. Cl.
CPC .......... *G06F 13/4068* (2013.01); *G06F 13/42* (2013.01); *G06F 3/0605* (2013.01); *G06F 3/0634* (2013.01); *G06F 3/0667* (2013.01); *G06F 3/0683* (2013.01); *G06F 2213/0026* (2013.01)

(58) Field of Classification Search
USPC ........................................................ 711/114
See application file for complete search history.

(56) References Cited

OTHER PUBLICATIONS

Second Office Action issued in Chinese Application No. 2015101842872 dated Mar. 5, 2019.
Non-Final Office Action issued in U.S. Appl. No. 15/095,969 dated Mar. 9, 2018.
Final Office Action issued in U.S. Appl. No. 15/095,969 dated Sep. 27, 2018.
Non-Final Office Action issued in U.S. Appl. No. 15/095,969 dated Feb. 8, 2019.
Notice of Allowance issued in U.S. Appl. No. 15/095,969 dated Jun. 5, 2019.

* cited by examiner

METHOD AND APPARATUS FOR SCALING OUT STORAGE DEVICES AND SCALED-OUT STORAGE DEVICES

RELATED APPLICATION

This application is a continuation of U.S. patent application Ser. No. 15/095,969 filed on Apr. 11, 2016 entitled "METHOD AND APPARATUS FOR SCALING OUT STORAGE DEVICES AND SCALED-OUT STORAGE DEVICES" which claims priority from Chinese Patent Application Number CN2015101842872, filed on Apr. 17, 2015 at the State Intellectual Property Office, China, titled "METHOD AND APPARATUS FOR SCALING OUT STORAGE DEVICES AND SCALED-OUT STORAGE DEVICES," the contents of which are herein incorporated by reference in entirety.

DISCLAIMER

Portions of this patent document/disclosure may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the present disclosure relate to the field of storage.

BACKGROUND OF THE INVENTION

Presently, traditional mid-range storage products may usually use a dual-controller architecture. For example, VNX series product manufactured by the EMC Corporation® consists of two controllers, known as Storage Processors (SPs).

Generally, in order to enlarge capacity of a product and improve performance of the product, multi-controllers may be introduced into mid-range storage products. However, designing and manufacturing a storage device with multi-controllers directly results in high cost; while, existing dual-controller storage products may need to be replaced, which causes waste of resources.

SUMMARY OF THE INVENTION

Exemplary embodiment of the disclosure provides a low-cost solution for scaling out storage devices. Example embodiments of the present disclosure provide an apparatus, a computer program product and a method for scaling out storage devices by establishing a cross-device link between a first storage device and a second storage device; exchanging configuration information of at least one of the first storage device and the second storage via the cross-device link; creating, in the first storage device, a shadow object corresponding to a real object in the second storage device; and creating, in the second storage device, a shadow object corresponding to a real object in the first storage device; wherein each shadow object can expose feature and/or state of a corresponding real object to users without implementing a functioning logic of the corresponding real object.

BRIEF DESCRIPTION OF THE DRAWINGS

Some embodiments according to the method and/or apparatus of the embodiments of the disclosure will now be described, by way of example only, and with reference to drawings. In the drawings.

DETAILED DESCRIPTION

Each exemplary embodiment of the disclosure will be described in details with reference to the drawings. It should be understood that these exemplary embodiments are provided only for those skilled in the art to better understanding and further implement the disclosure rather than for limiting the scope of the disclosure in any manner.

References in the specification to "one embodiment", "an embodiment", "a preferred embodiment" etc., indicate that the embodiment described may include a particular feature, structure, or characteristic, but every embodiment may not necessarily include the particular feature, structure, or characteristic. Moreover, such phrases are not necessarily referring to the same embodiment. It should also be understood that various terminology used herein is for the purpose of describing particular embodiments only and is not intended to be liming of the disclosure. As used herein, the singular forms "a", "an" and "the" may include the plural forms, unless the context clearly indicates otherwise. It will be further understood that the terms "comprises", "has" and "including" used herein, specify the presence of stated features, elements, and/or components etc., but do not preclude the presence of one or more other features, elements, components and/or combinations thereof. For example, the term "multiple" used here indicates "two or more"; the term "and/or" used here may comprise any or all combinations of one or more of the items listed in parallel. Definitions of other terms will be specifically provided in the following description. Furthermore, in the following description, some functions or structures well-known to those skilled in the art will be omitted in order not to obscure embodiments of the disclosure in the unnecessary details.

For the sake of completeness and better understanding, main principles of the disclosure will be described with reference to the existing storage products with dual controllers, such as the VNX2 of EMC Corporation, however, as understood by those skilled in the art, the disclosure is not limited to the examples disclosed here, but can be more widely applied to other storage devices/products. For example, the method and apparatus of the disclosure can be applied to the scaling-out of any storage device, as long as it is compatible with the characteristics presented herein.

In one embodiment a method for scaling out the storage devices may include establishing a cross-device link between a first storage device and a second storage device; exchanging configuration information of at least one of the first storage device and the second storage via the cross-device link. A further embodiment may include creating, in a first storage device, a shadow object corresponding to a real object in a second storage device. A further embodiment may include creating, in a second storage device, a shadow object corresponding to a real object in a first storage device; wherein each shadow object may expose feature and/or state of a corresponding real object to users without implementing a functioning logic of a corresponding real object.

In one embodiment, both a first storage device and a second storage device may include a disk. A further embodiment may include discovering a disk in either storage device of a first storage device and a second device when either storage device boots from scratch or a new disk gets into either storage device. A further embodiment may include creating a real object in either storage device after discovering a disk, so as to track disk configuration and/or state of either storage device. A further embodiment may include exchanging configuration information of at least one of a first storage device and a second storage device via a cross-device link, and may further include exchanging disk configuration and/or state of either storage device.

In another embodiment, a first storage device and a second storage device may be storage arrays, and a real object may include at least one of the followings: a Physical Drive Object (PDO), a Redundant Array of Independent Disk (RAID) Group (RG), a Logical Unit (LUN) and a volume of a disk.

In a further embodiment, both a first storage device and a second storage device may include a Storage Processor (SP). A further embodiment may include setting an SP of a first storage device and a corresponding SP of a second storage device as a remote peer SP of each other. In a further embodiment creating a shadow object in a first storage device may include creating a shadow object for a corresponding remote peer SP in a SP of a first storage device. In a further embodiment creating a shadow object in a second storage device may include creating a shadow object for a corresponding remote peer SP in a SP of a second storage device.

In one embodiment, both a first storage device and a second storage device may include an active SP. A further embodiment may include detecting a peer status between an active SP of a first storage device and an active SP of a second storage device via a cross-device link. In another embodiment, at least one storage device of a first storage device and a second device may include a passive SP for increasing availability. A further embodiment may include promoting a passive SP of the at least one storage device to be a new active SP, if an active SP of at least one storage device fails.

In a further embodiment, setting an SP of a first storage device and a corresponding SP of a second storage device as a remote peer SP of each other may include setting an active SP of a first storage device and an active SP of a second storage device as a remote peer SP of each other when both the first storage device and the second storage device may only include an available active SP. A further embodiment may include setting both an active SP and a passive SP of a first storage device as remote peer SPs of an active SP of a second storage device when the first storage device includes an available active SP and a passive SP and the second storage device only comprises an available active SP. A further embodiment may include setting an active SP of a first storage device and an active SP of a second storage device as a remote peer SP of each other and setting a passive SP of the first storage device and a passive SP of the second storage device as a remote peer SP of each other when both the first storage device and the second storage device may include an active SP and a passive SP.

A further embodiment may include receiving, at a first storage device, an input/output (I/O) request from a user. A further embodiment may include, if a target of an I/O request is a real object, causing a first storage device to process the I/O request. A further embodiment may include if a target of an I/O request is a shadow object, causing a first storage device to redirect the I/O request to a second storage device, wherein a shadow object, as a target of an I/O request, corresponds to a real object in a second storage device.

In another embodiment, causing a first storage device to redirect an I/O request to a second storage device may include at least one of the followings:

if an I/O request is a read request, causing a first storage device to redirect the I/O request to a second storage device via a cross-device link; causing a second storage device to process the I/O request and return data to a first storage device via a cross-device link, so as to enable the first storage device to return data to a user;

if an I/O request is a write request, causing a first storage device to forward data to be written to a second storage device via a cross-device link; causing a second storage device to process the I/O request and return processing result to the first storage device via the cross-device link, so as to enable the first storage device to return a processing result to a user. In one embodiment, a cross-device link may be executed by at least one of the TCP/IP, FCC, INIFINIBAND and PCI-E protocols.

In one embodiment, an apparatus corresponding to the method described above for scaling out storage devices may be provided. In a further embodiment, an apparatus may include a link unit that may be configured to establish a cross-device link between a first storage device and a second storage device. In a further embodiment, apparatus may include a management unit that may be configured to exchange configuration information of at least one of a first storage device and a second storage via a cross-device link. In a further embodiment, apparatus may include a shadow object creation unit that may be configured to create, in a first storage device, a shadow object corresponding to a real object in a second storage device. In a further embodiment apparatus may be configured to create, in a second storage device, a shadow object corresponding to a real object in a first storage device. In a further embodiment, each shadow object may expose features and/or state of a corresponding real object to a user without implementing a functioning logic of a corresponding real object.

In a further embodiment, an apparatus for scaling out storage devices may include at least one processor; and at least a memory that may include computer program codes, wherein the at least memory and the computer program codes are configured, with the at least one processor, to cause the apparatus to execute the method described herein.

In a further embodiment, a computer program product may be embodied in a computer-readable medium and may include a computer-readable program instruction which may implement any method disclosed herein when loaded into an apparatus.

In a further embodiment, a scaled-out storage device may include an apparatus according to one embodiment of the disclosure for scaling out storage devices, and a first storage device and a second storage device. In a further embodiment, if a user need to extend performance, bandwidth and capacity of an existing device, the user may purchase same existing devices and obtain scaled-out devices via the method and apparatus of the embodiments of the disclosure disclosed herein instead of purchasing high-range array products to save cost.

Figure 1A:
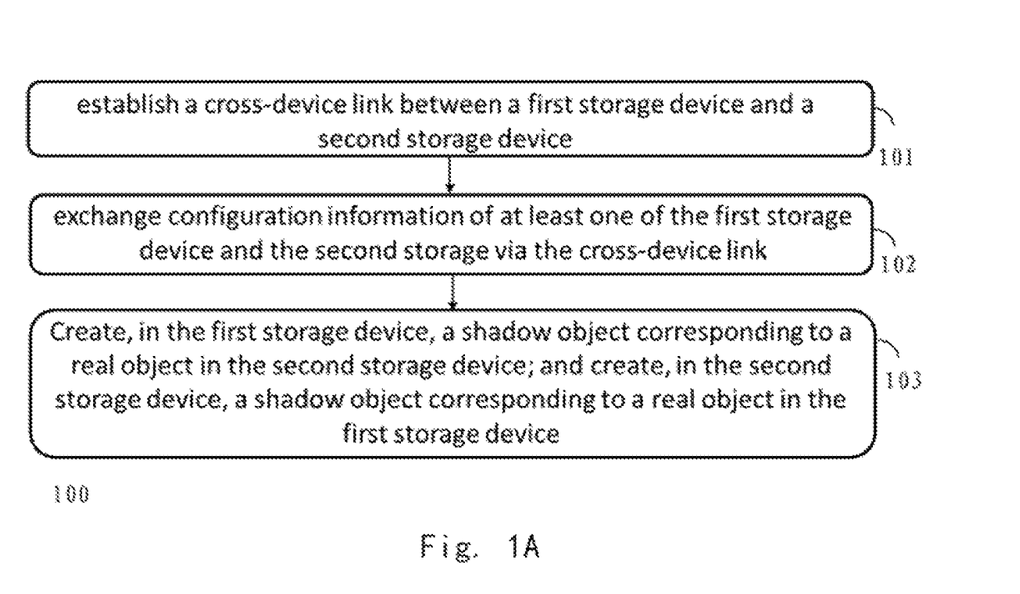
FIGS. 1A-1B illustrates a flowchart of a method for scaling out storage devices according to exemplary embodiments of the disclosure.

First, a method according to an embodiment of the disclosure will be described below with reference to FIG. 1A. As shown in FIG. 1A, in step S101, a cross-device link between a first storage device and a second storage device is established; in step S102, configuration information of at least one of the first storage device and the second storage is exchanged via the cross-device link; in step S103, in the first storage device, creating a shadow object corresponding to a real object in the second storage device; and in the second storage device, creating a shadow object corresponding to a real object in the first storage device; wherein each shadow object can expose feature and/or state of a corresponding real object to a user without implementing a functioning logic of the corresponding real object. In some embodiment method 100 allows scaling out existing storage devices with mid-range performance (i.e., a first storage device and a second storage device) to obtain high performance storage devices, such that performance improvement of a storage system may be achieved by reusing current storage resources.

According to an embodiment of the disclosure, a first storage device and a second storage device may be existing storage products of VNX series, such as VNX2 series. In one embodiment, VNX2 may have two storage processors. In a further embodiment, VNX2 series may introduce an entirely new Block Operating environment, known as MCx. In a further embodiment, MCx may be a combination of Multi-core Cache (MCC), Multicore RAID (MCR) and Multicore FAST Cache (MCF), which may enable an array to fully leverage the new Intel multicore Central Processing Unit (CPU) architecture. In a further embodiment, when an input/output (I/O) is coming down from MCC, MCR may handle the I/O to back end storage. In a further embodiment, MCC may provide a cache ability and MCR may be responsible for discovering/managing backend disks and implementing Redundant Array of Independent Disks (RAID) algorithm. In a further embodiment, both MCC and MCR drivers may define internal objects to track and manage backend storages (HDDs or SSDs).

Figure 2:
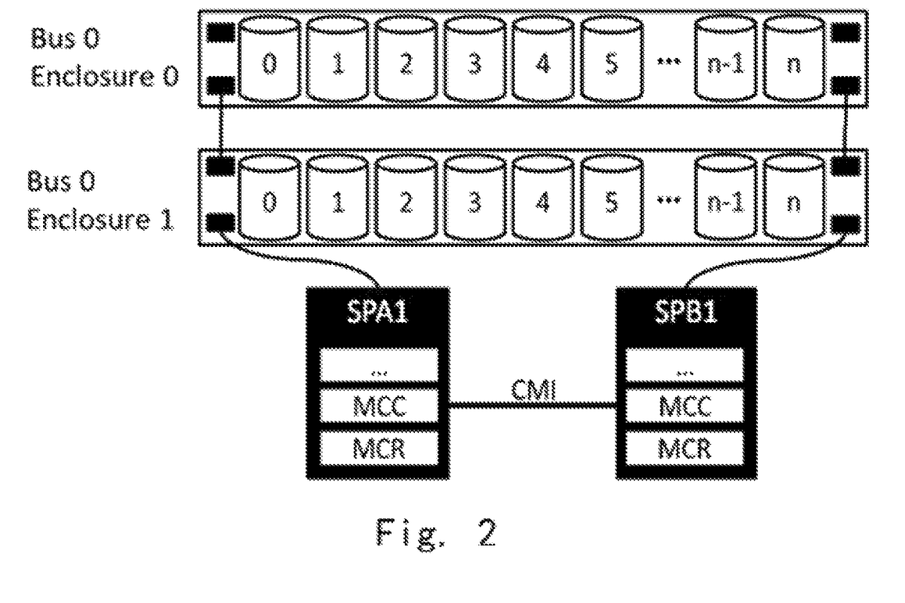
FIG. 2 shows a schematic diagram of a structure for a first storage device according to an exemplary embodiment of the disclosure.

FIG. 2 shows an exemplary structure diagram of the first storage device according to an embodiment of the disclosure. As illustrated in FIG. 2, exemplary first storage device includes two storage processors, indicated as SPA1 and SPB1. Each storage processor includes an MCC, an MCR and other possible modules that are not shown in the Figure. In the example of FIG. 2, a first storage device further includes two disk enclosures, which are indicated as "Bus 0 Enclosure 0" and "Bus 0 Enclosure 1" respectively, wherein both the two disk enclosures include n+1 disks, labeled from 0 to n. The two disk enclosures are attached to storage processors SPA1 and SPB1. The two storage processors are also interconnected, for example through Communication Manager Interface (CMI). As understood by those skilled in the art, embodiments of the disclosure are not restricted to adopting the exemplary structure shown in FIG. 2 as a first storage device, and contrarily, the first storage device can be any storage devices. Besides, a second storage device can have a structure or configuration that is different from or identical to that of the first storage device.

Figure 3:
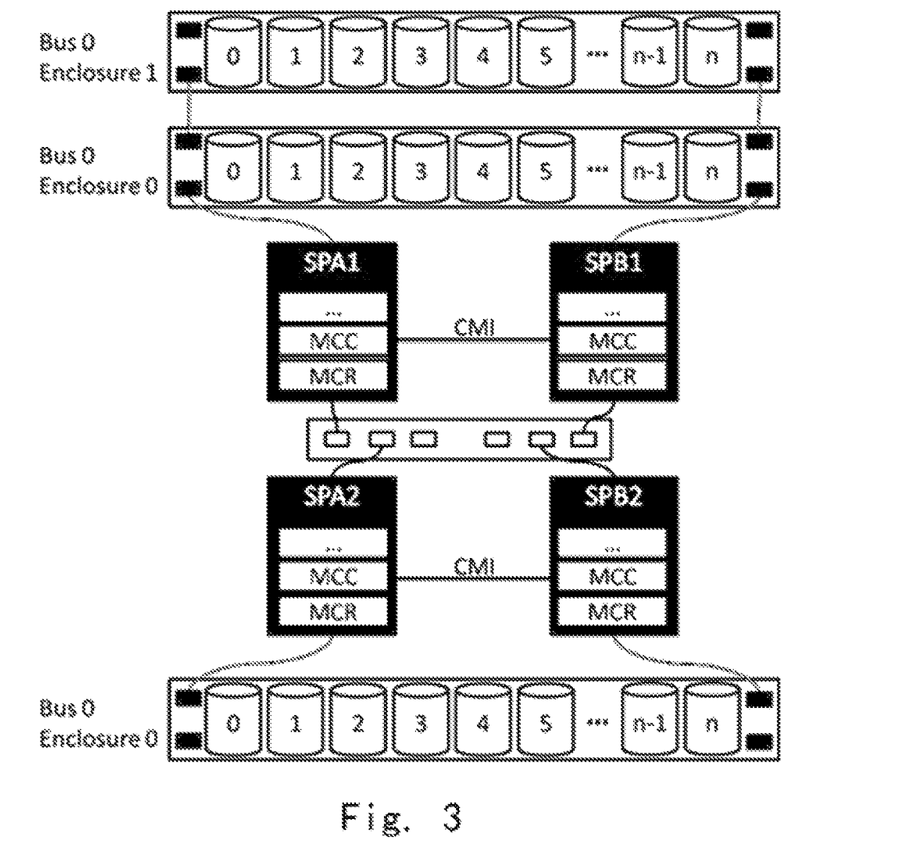
FIG. 3 schematically illustrates a structure diagram of a scaled out storage device obtained using a first storage device and a second storage device according to an exemplary embodiment of the disclosure.

FIG. 3 shows a diagram of an exemplary storage device obtained by scaling out according to method 100. In FIG. 3, it is assumed that a first storage device has the structure shown in FIG. 2, and a second storage device has a similar structure, for example comprising two storage processors (indicated as SPA2 and SPB2) and only one disk enclosure (indicated as "Bus 0 Enclosure 0"), which includes n+1 disks. The first storage device and the second storage device are interconnected via the cross-device link to exchange configuration information concerning the first storage device and/or the second storage device. In one embodiment, the cross-device link can be any one of the TCP/IP, FCC, INFINIBAND and PCI-E, and the embodiments of the disclosure are not restricted to these.

Figure 1B:
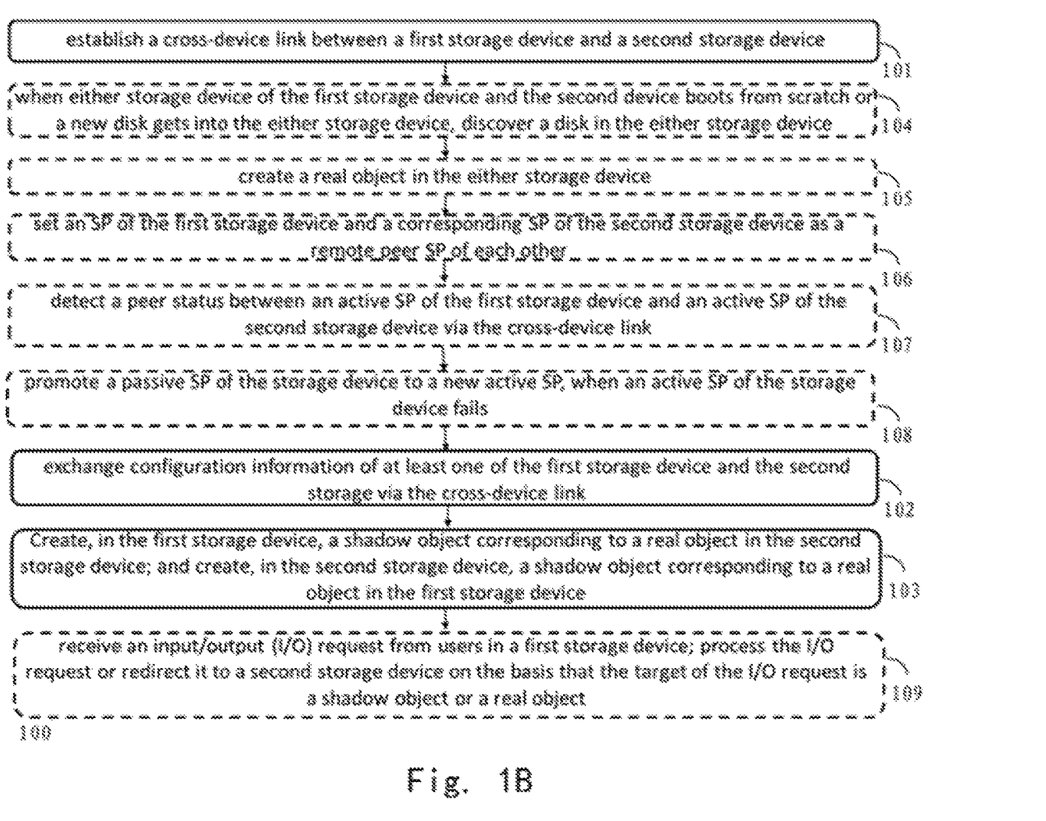

Reference is now made to FIG. 1B shows another embodiment of method 100. In some embodiments, it is assumed that both a first storage device and a second storage device comprise a disk, as shown in FIG. 2. In step S101 a cross device link between a first storage device and a second storage device is established. In step 104, when either storage device of the first storage device and the second storage device boots from scratch or a new disk gets into either storage device, a disk in either storage device is discovered. In step 105, a real object in either storage device is created. In step 106, set a SP of the first storage device and a corresponding SP of the second storage device as a remote peer SP of each other. In step 107, a peer status between an active SP of the first storage device and an active SP of the second storage device is detected via the cross device link. In step 108, a passive SP of the storage device is promoted to a new active SP, when an active SP of the storage device fails. In step 102, configuration information of at least one of the first storage device and the second storage device is exchanged via the cross device link. In step 103, create, in the first storage device a shadow object corresponding to a real object in the second storage device, and create, in the second storage device, a shadow object corresponding to a real object in the first storage device. In Step 109, receive an I/O request from a user in the first storage device, process the I/O request or redirect the request to the second storage device on the basis that the target of the I/O request is a shadow object of the real object.

In another embodiment, a first storage device and a second storage device may be storage arrays and a real object may include at least one of the followings: a Physical Drive Object (PDO), a Redundant Array of Independent Disk (RAID) Group (RG), a Logical Unit Number (LUN) and a volume of a disk. In a further embodiment, a volume may be used to track a device that can be exposed to an upper layered driver or users, and it may be exposed as a standard block drive. In a further embodiment, RG object may provide RAID GROUP algorithm upon processing I/O and delivering I/O to back end storage. In a further embodiment, LUN may also be exposed to SP as a standard block device and it may have 1 to 1 mapping with a volume; while PDO may be used to track objects, e.g., disk state, disk type etc.

In a further embodiment, both a first storage device and a second storage device may include storage processors (SPs), as shown in FIG. 3. A further embodiment may include, setting an SP of the first storage device and a corresponding SP of the second storage device as a remote peer SP (RPSP) of each other. A further embodiment may include creating a shadow object for a corresponding remote peer SP (i.e., SP of a second storage device) in a SP of a first storage device.

A further embodiment may include creating a shadow object in a second device includes creating a shadow object for a corresponding remote peer SP (i.e., SP of the first storage device) in a SP of a second storage device.

In one embodiment, both a first storage device and a second storage device may include an active SP. A further embodiment may include detecting a peer status between an active SP of a first storage device and an active SP of a second storage device via the cross-device link. In an example embodiment, detecting a peer status may include, but no limited to, detecting whether RPSP exists or is initiated, and/or, the role of RPSP in a cross-device communication. In another example embodiment, an active SP of a first storage device and an active SP of a second storage device detect a peer status via a cross-device link through a heartbeat mechanism, and embodiments of the disclosure are not restricted to this. In a further embodiment an active SPs may also detect a peer status there between through other ways different from heartbeat.

In another embodiment, at least one storage device of a first storage device and a second storage device includes a passive SP for increasing availability, for example, reducing an occurrence of faults. A further embodiment may include, promoting a passive SP of the at least one storage device to a new active SP, when an active SP of at least one storage device fails.

A further embodiment may include setting an SP of a first storage device and a corresponding SP of a second storage device as remote peer SP (RPSP) of each other by:

(1) setting an active SP of a first storage device and an active SP of a second storage device as a remote peer SP of each other, when both the first storage device and the second storage device only include an available active SP;

(2) setting both an active SP and a passive SP of a first storage device as remote peer SPs of an active SP of a second storage device, when the first storage device includes an available active SP and a passive SP and the second storage device only includes an available active SP; and (3) setting an active SP of a first storage device and an active SP of a second storage device as a remote peer SP of each other and setting a passive SP of the first storage device and a passive SP of the second storage device as a remote peer SP of each other, when both the first storage device and the second storage device includes an active SP and a passive SP.

In certain embodiments, it may be assumed that a first storage device and a second storage device may be products of VNX2 series, and specific examples are provided under this assumption. However, those skilled in the art can understand that embodiments of the disclosure are not restricted thereto, but can be applied to a first storage device and a second storage device of any type.

In an exemplary embodiment, when a disk array boots from scratch or a new drive gets into an array, a SP therein (e.g., MCR in SP) may discover a disk. In a further embodiment, a real object (e.g., PDO) may be created to track a disk configuration and state. In n a further embodiment, after discovery of a disk, SPs from two arrays (e.g., MCR in SP) may exchange disk configuration and state via a cross-array link. In a further embodiment, after receiving exchanged configuration information, a shadow object (e.g., shadow PDO) may be created in RPSP. In a further embodiment, both a real object and a shadow object expose driver configuration and state to an array configuration software, such that users may see a local disk and a remote disk.

In a further embodiment, the created real object and shadow object may include a RG and a LUN. In an example embodiment, after discovery of a disk, when a user initiates a request to create RG in a local disk, RG will be created on a real PDO. In a further embodiment, SP in an array (e.g., may be MCR component in SP) may synchronize RG creation request to RPSP via a cross-device link, such that a shadow RG may be created in another storage device. In another example embodiment, when a user initiates a request to create RG on a shadow PDO, the request will be sent to RPSP to create a real RG. In a further embodiment, a shadow RG creation request may be sent back accordingly for creating a shadow RG. In a further embodiment, a real RG and a shadow RG may be created with synchronized state and configuration.

In a further example embodiment, when users initiate a request to bind a LUN to a real RG, LUN may be bound to a real RG, just as it is processed in VNX2. In a further embodiment, SP on array (e.g., MCR in the SP) may synchronize LUN creation request to RPSP. In a further embodiment, RPSP (e.g., MCR component therein) may create a shadow LUN. In another example embodiment, when users initiate a request to bind a LUN to a shadow RG, the request will be sent to RPSP to bind a real LUN and a real LUN may be created. In a further embodiment, a shadow LUN binding request may be sent back accordingly. In a further example embodiment, MCR may expose both a real LUN and a shadow LUN to MCC. In a further embodiment, MCC may create a real volume and a shadow volume for these LUNs.

In one embodiment, it should be noted that, in the disclosure, "real" may be just a contrary term to "shadow". In a further embodiment, real objects may correspond to, for example, objects in an existing VNX2 technical terms. In a further embodiment, VNX2, MCC and MCR drivers may define and implement internal objects to track and maintain devices' state, wherein a device includes disks connected to SPs directly and RG/LUN/Volume built on those local disks. In a further embodiment, MCC and MCR may also implement IO functioning logic into those objects, such as Volume, RG, LUN and PDO, and all may have corresponding real object. However, in a certain embodiment, the disclosure further introduces "shadow object," that may be used to track/manage the devices from a remote array. In one embodiment, shadow object may have the following characteristics:

1. Shadow object may have a corresponding real object on a RPSP.

2. The real object visible to users may have a corresponding shadow object, such as PDO, RG, LUN and Volume.

3. Shadow object may only expose devices' characteristics/state to users via array configuration path software. No functioning logic may be implemented in the shadow object.

Figure 4:
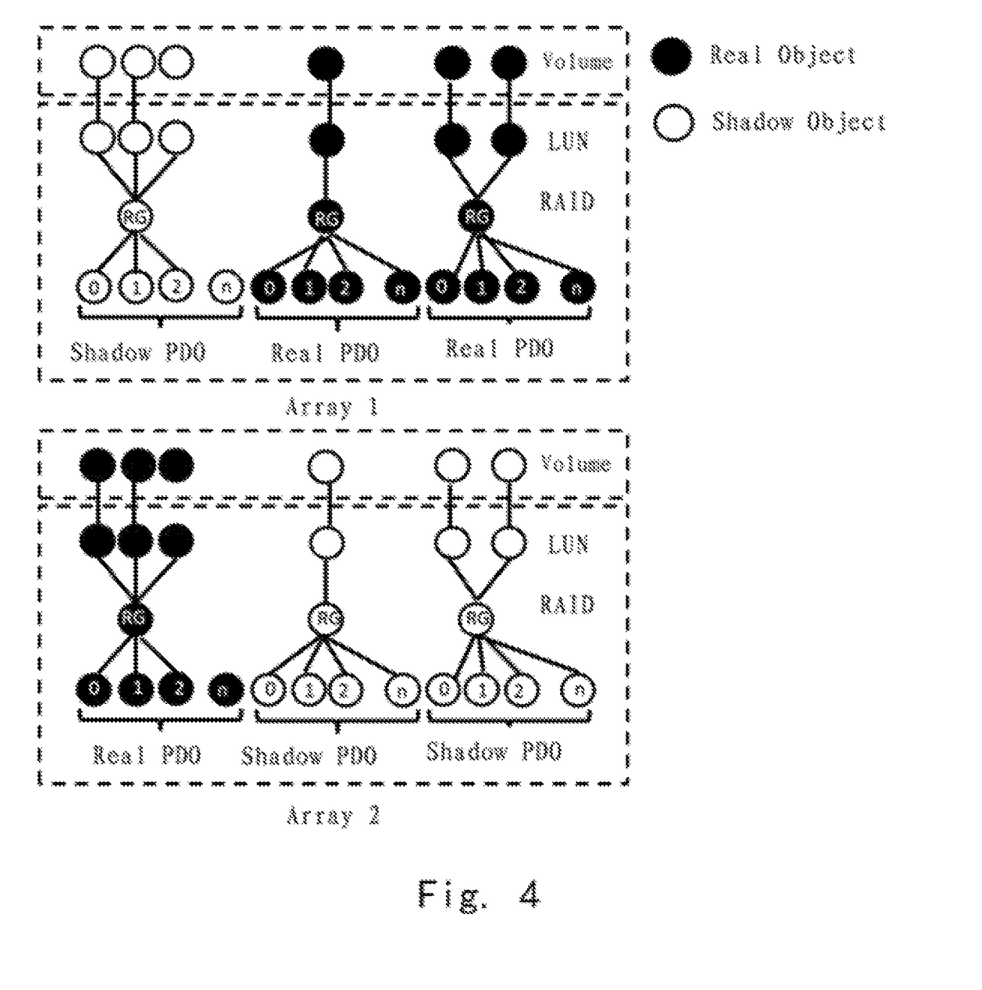
FIG. 4 schematically illustrates a topological structure diagram of a scaled out storage device obtained by using a first storage device and a second storage device according to an exemplary embodiment of the disclosure.

FIG. 4 shows a topological diagram of a scaled-out storage device created according to an exemplary embodiment of the disclosure. In the example of FIG. 4, it is assumed that a first device (array 1) includes two disk enclosures while a second device (array 2) includes one disk enclosure. As shown in FIG. 4, two groups of real objects (including PDO, RG, LUN and Volume) and a group of shadow objects that correspond to the real objects in the array 2, are created in the array 1; a group of real objects and two groups of shadow objects that correspond to the real objects in the array 1 are created in the array 2.

One embodiment may include receiving, at a first storage device, an input/output (I/O) request from users; if a target of an I/O request is a real object, causing a first storage device to process the I/O request; and if a target of the I/O request is a shadow object, causing a first storage device to redirect the I/O request to a second storage device, wherein a shadow object, as a target of the I/O request, corresponds to a real object in a second storage device.

In another embodiment, a first storage device to may redirect an I/O request to a second storage device by one of the following ways:

(1) if an I/O request is a read request, causing a first storage device to forward the I/O request to a second storage device via a cross-device link; causing a second storage device to process the I/O request and return data to a first storage device via a cross-device link, so as to enable a first storage device to return a data to users;

(2) if an I/O request is a write request, causing a first storage device to forward data to be written to a second storage device via a cross-device link; causing a second storage device to process the I/O request and return processing result to a first storage device via a cross-device link, so as to enable a first storage device to return a processing result to a user.

Figure 5:
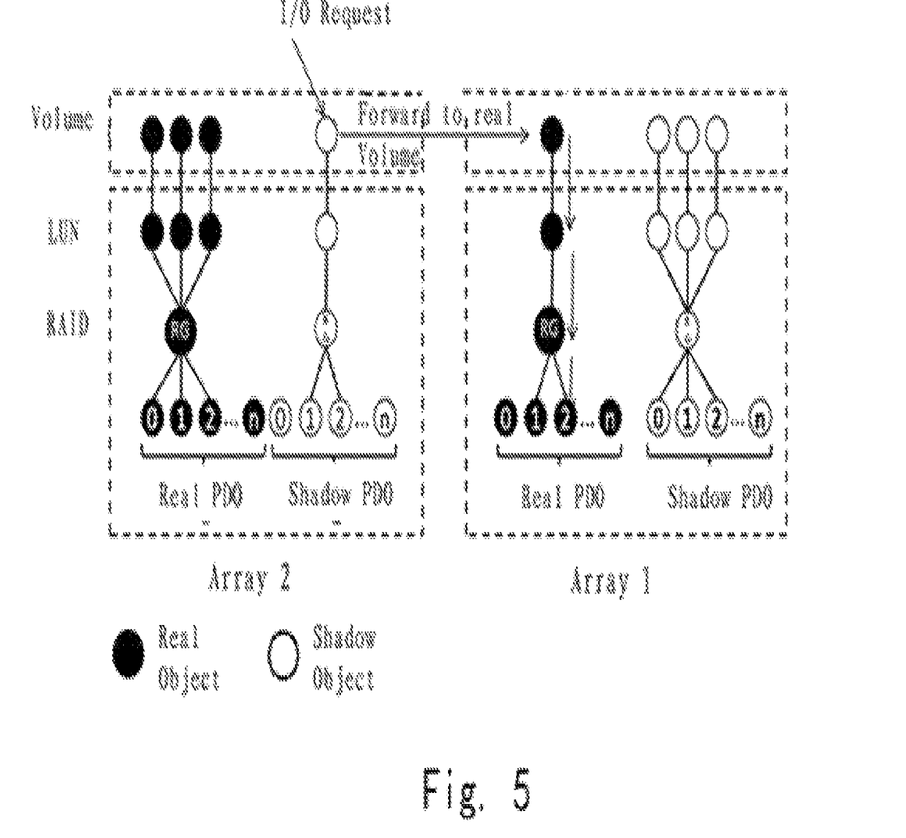
FIG. 5 schematically illustrates a diagram of forwarding an I/O request according to an exemplary embodiment of the disclosure.

FIG. 5 shows a diagram of redirecting an I/O request (or, I/O routing) according to an exemplary embodiment of the disclosure. In an example of FIG. 5, an I/O request is initially sent to a shadow volume of array 2. Then, the I/O request is forwarded to a real volume on RPSR (SP on array 1) and is processed by the RPSR.

In one embodiment, all software layers located above MCC, such as mapped LUN (MLU), may consider all volumes as real. In a further embodiment, shadow object may be invisible to MLU. According to some embodiments, a Scale-Out story may stop at MCC. In some other embodiment, other layers may leverage a Scale-Out block side (MCx) to complete their Scale-Out story, or they have no need for its own Scale-Out story since block side may have a Scale-Out story.

In one embodiment, MCC may get to know whether a LUN/Volume is a real or shadow one, because MCC may hold the memory. In a further embodiment, MCC may afford I/O forwarding works in a whole software stack. In a further embodiment, letting MCC know whether a LUN/Volume is real or shadow may improve a cache hit percentage caused by somewhat 'data partitioning'. According to some embodiments, any MCC on any SP may only be responsible for caching hot data from real LUN/Volume.

In some embodiments, MCC in a SP may be responsible for forwarding I/O from shadow volumes to corresponding real volumes. In some other embodiments, MCR may be responsible for local disk discovery, sending disk/RG/LUN/configuration/metadata to MCR on RPSP, creating shadow PDO after obtaining remote disk configuration, and creating/managing real and corresponding shadow RG/LUN objects, etc. However, as understood by those skilled in the art, embodiments of the disclosure are not limited to this. In other embodiments, above disclosed operations/functions may also be implemented by other components.

With embodiments of the disclosure, a plurality of storage processors (SPs) from two storage devices may be clustered together and they may be configured to display a same view on disks, RG, LUN and Volumes to users; all SPs may serve an I/O targeted at both local disk and remote disk. In some embodiment, SPs of a plurality of storage devices may provide a universal Namespace of a whole back end storage to a host.

In an example embodiment of VNX2, 2+2 Scaled out VNX2 may enable a whole system gain higher performance (e.g., IO per second), bandwidth and capacity than an existing VNX2, by combining two VNX2 arrays. In an example embodiment, VNX 8000 may support 1500 disks, but a scaled-out architecture according to embodiments of the disclosure allows 3000 disks available to a system. In addition, according to embodiments of the disclosure, if users need to scale out performance, bandwidth and capacity of an existing equipment, a user may purchase the same VNX, instead of purchasing a high-range array product, to save cost.

Furthermore, although some embodiments of the disclosure describe a scale-out method with two storage devices as examples, it is understood by those skilled in the art that the method also applies to a scale-out of more than two devices. In an example embodiment, when more than two storage devices are combined to obtain a scaled-out storage device with higher performance, any two of a plurality of storage devices may be combined according to any of the method described with reference to FIGS. 1A-5. In some embodiments, during actual implementation, a variable number of storage devices may be combined according to any of the method described with reference to FIGS. 1A-5 to realize a scale-out based on the actual needs.

The above describes embodiments of method 100 with reference to FIGS. 1A to 5. The following will introduce an apparatus 600 for scaling out storage devices according to exemplary embodiments of the disclosure with reference to FIG. 6. Apparatus 600 can implement any method described with reference to FIGS. 1A-5, but not limited to the method 100. Besides, method 100 described with reference to FIGS. 1A-5 may be implemented by apparatus 600, but is not limited to be implemented by apparatus 600. For example, in some embodiments, at least one step of the method 100 can be implemented by another apparatus.

Figure 6:
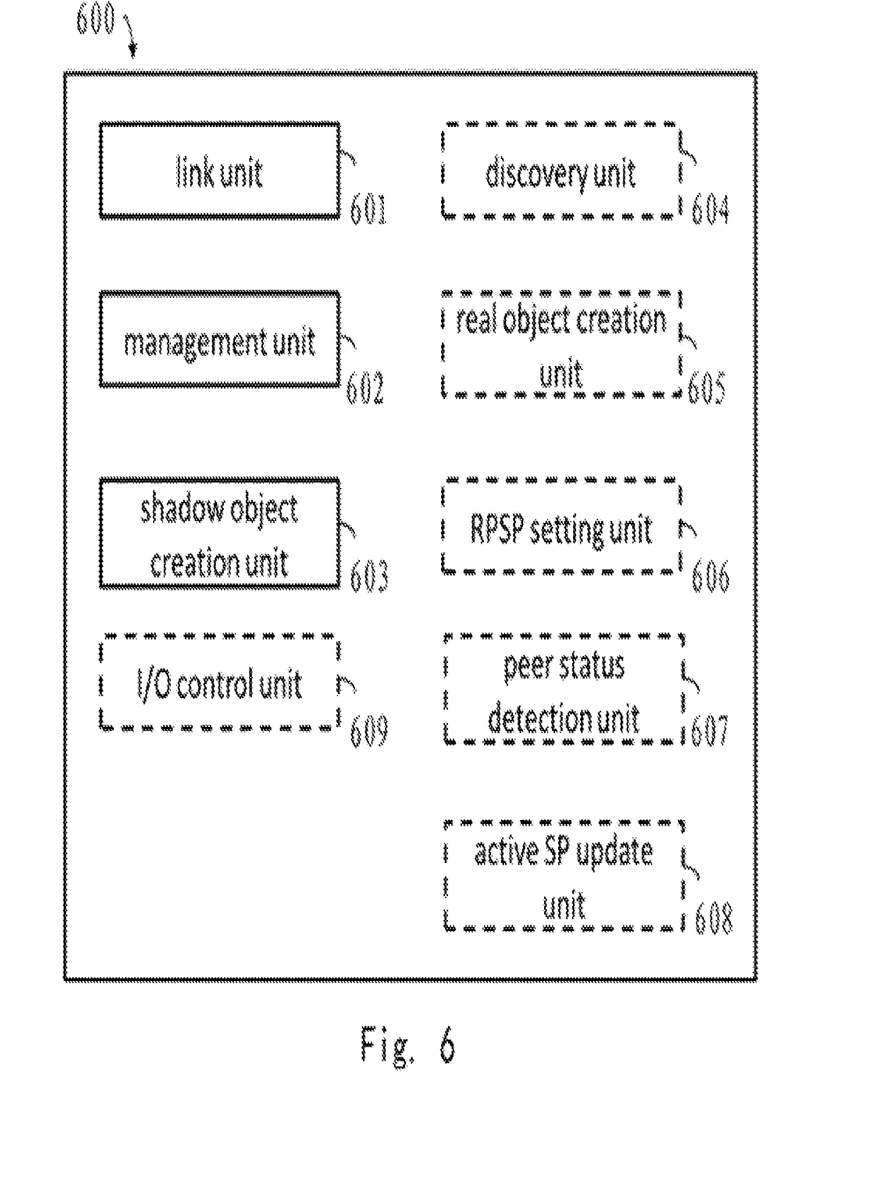
FIG. 6 schematically illustrates a structure diagram of an apparatus for constructing a scalable storage device according to exemplary embodiments of the disclosure.

As shown in FIG. 6, the apparatus 600 comprises link unit 601 configured to establish a cross-device link between a first storage device and a second storage device; management unit 602 configured to exchange configuration information of at least one of the first storage device and the second storage device via the cross-device link; and shadow object creation unit 603 configured to create, in the first storage device, a shadow object corresponding to a real object in the second storage device; and configured to create, in the second storage device, a shadow object corresponding to a real object in the first storage device; wherein each shadow object can expose features and/or state of a corresponding real object to users without implementing a functioning logic of the corresponding real object. In one embodiment, the cross-device link can comprise, but not limited to, one of the TCP/IP, FCC, INIFINIBAND and PCI-E.

According to an embodiment, link unit 601, management unit 602 and shadow object creation unit 603 may be configured to respectively implement operations of the steps S101, S102 and S103 described with reference to FIG. 1A. Therefore, the descriptions of steps S101, S102 and S103 with reference to FIGS. 1A-5 also apply here, correspondingly, specific exemplary functions of link unit 601, management unit 602 and shadow object creation unit 603 will not be repeated one by one.

In one embodiment, both a first storage device and a second storage device comprise a disk and the apparatus may include: discovery unit 604 configured to discover a disk in either storage device of the first storage device and the second device when either storage device boots from scratch or a new disk gets into either storage device; and real object creation unit 605 configured to create a real object in the either storage device after the discovery of the disk, so as to track disk configuration and/or state of either storage device; and wherein management unit 602 can be configured to exchange information of the disk configuration and/or state of either storage device.

In another embodiment, a first storage device and a second storage device may be storage arrays, and a real object may include at least one of the followings: a Physical Drive Object (PDO), a Redundant Array of Independent Disk Group (RG), a Logical Unit (LUN) and a volume of a disk.

In a further embodiment, a first storage device and a second storage device comprise a storage processor (SP) and the apparatus may include: remote peer SP (RPSP) setting unit 606, configured to set an SP of the first storage device and a corresponding SP of the second storage device as a remote peer SP (RPSP) of each other; and wherein shadow object creation unit 603 may be configured to create a shadow object for a corresponding remote peer SP in the SP of the first storage device; and create a shadow object for a corresponding remote peer SP (i.e., SP of the first storage device) in the SP of the second storage device.

In one embodiment, both a first storage device and a second storage device comprise an active SP and apparatus 600 may include peer status detection unit 607, configured to detect a peer status between an active SP of the first storage device and an active SP of the second storage device via the cross-device link.

In another embodiment, at least one storage device of a first storage device and a second device may include a passive SP for increasing availability; and apparatus 600 may include active SP update unit 608, configured to promote the passive SP of the at least one storage device to be a new active SP if an active SP of the at least one storage device fails.

In one embodiment, remote peer SP setting unit 606 can be configured to set an SP of the first storage device and a corresponding SP of the second storage device as a remote peer SP of each other by means of:

(1) setting an active SP of the first storage device and an active SP of the second storage device as a remote peer SP of each other when both the first storage device and the second storage device only includes an available active SP;

(2) setting both an active SP and a passive SP of the first storage device as remote peer SPs of an active SP of the second storage device when the first storage device includes an available active SP and a passive SP and the second storage device only includes an available active SP; and (3) setting an active SP of the first storage device and an active SP of the second storage device as a remote peer SP of each other and setting a passive SP of the first storage device and a passive SP of the second storage device as a remote peer SP of each other when both the first storage device and the second storage device includes an active SP and a passive SP.

According to an embodiment, discovery unit 604, real object creation unit 605, remote peer SP setting unit 606, peer status detection unit 607 and active SP update unit 608 may be configured to implement operations of the steps S104-S108 described with reference to FIG. 1B. Therefore, the descriptions of steps S104-S108 with reference to FIGS. 1B-5 also apply here and will not be repeated one by one accordingly.

In one embodiment of the disclosure, apparatus 600 may include input/output I/O control unit 609, configured to, when receiving an input/output (I/O) request from users in a first storage device, if a target of the I/O request is a real object, cause a first storage device to process the I/O request; and if a target of the I/O request is a shadow object, cause a first storage device to redirect the I/O request to a second storage device, wherein a shadow object, as a target of the I/O request, corresponds to a real object in a second storage device.

In another embodiment, input/output I/O unit 609 can be configured to cause the first storage device to redirect the I/O request to the second storage device by one of the following means:

(1) if the I/O request is a read request, causing the first storage device to forward the I/O request to the second storage device via the cross-device link; causing the second storage device to process the I/O request and return data to the first storage device via the cross-device link, so as to enable the first storage device to return data to the users;

(2) if the I/O request is a write request, causing the first storage device to forward data to be written to the second storage device via the cross-device link; causing the second storage device to process the I/O request and return processing result to the first storage device via the cross-device link, so as to enable the first storage device to return processing result to users.

Although some embodiments of the disclosure describe apparatus 600 for scaling out storage devices with two storage devices as examples, it can be understood by those skilled in the art that the apparatus is also applicable to the scaling-out of more than two devices. In an example embodiment, when more than two storage devices are to be combined to obtain a scaled-out storage device with higher performance, any two of the plurality of storage devices may be combined according to any apparatus described with reference to FIG. 6. In an actual implementation embodiment, a variable number of storage devices may be combined according to any apparatus described with reference to FIG. 6, based on actual needs.

As stated above, method 100 and apparatus 600 according to embodiments of the disclosure enable to obtain a storage system with higher performance using low-range storage devices, such that performance may be improved by reutilizing existing storage resources. Although some embodiments describe implementations of the method/apparatus of the disclosure by taking certain configurations as examples (e.g., taking VNX2 as a structure example of the first storage device and the second storage device), embodiments of the disclosure are not limited to this, but can be more widely applied, just can be appreciated by those skilled in the art.

Those skilled in the art should understand that any structure diagram described here represents an explanatory schematic diagram for implementing the principles of the disclosure. Similarly, it should be understood that the flowchart described here represents various processes that can be specifically embodied in a machine-readable medium and can be implemented by a machine or a processing device, no matter whether such machine or processing device is explicitly shown. The steps in the flowchart can be performed in any appropriate order, not necessarily in the listed order.

Those skilled in the art should also understand that each unit included in apparatus 600 according to embodiments of the disclosure can be implemented in various manners, including software, hardware, firmware or any combinations thereof. For example, in some embodiments, apparatus 600 can be implemented by means of software and/or firmware. Alternatively and additionally, apparatus 600 can be partially or fully implemented based on hardware. For example, one or more units in apparatus 600 can be implemented as integrated circuit (IC) chip, application specific integrated circuit (ASIC), system-on-chip (SOC), and field programmable gate array (FPGA) etc. The scope of the disclosure is not limited in this regard.

The disclosure can be a system, a method and/or a computer program product. The computer program product can comprise computer-readable medium with computer-readable program instructions recorded thereon for allowing the processing device/machine to implement each aspect of the disclosure. According to one embodiment of the disclosure, the disclosure can be implemented by an apparatus for scaling out storage devices, the apparatus comprising at least one processor; and at least one memory including a computer program codes, wherein the at least one storage and the computer program code are configured to, with the at least one processor, to cause the apparatus to implement any of the above method described with reference to FIGS. 1A-5. According to another embodiment, the disclosure can be implemented by a computer program product being embodied in a computer-readable medium and comprising a computer-readable program instruction; the computer-readable instruction implements any method according to embodiments of the disclosure when being loaded into an apparatus.

An embodiment of the disclosure also provides a scaled-out storage device, which may include for example, any apparatus 600 described with reference to FIG. 6, and a first storage device and a second storage device.

The above descriptions with reference to the drawings are only provided for exemplary purpose to explain the disclosure. Those skilled in the art can understand that different structures can be proposed based on the above described principles of the disclosure. Although these different structures are not described or shown explicitly, they all embody the principles of the disclosure and are included within the spirit and scope thereof. Furthermore, all examples mentioned herein are expressly for pedagogical purpose to help the reader to understand the principles of the disclosure and the ideas contributed by the inventor to further develop the field. They should not be construed as limitations to the scope of the disclosure. Besides, the descriptions of all the mentioned principles, aspects and embodiments of the disclosure and the specific examples include their equivalents.

What is claimed is:

1. A method for scaling out storage devices, the method comprising:
    establishing a cross-device link between a first storage device and a second storage device, wherein the cross-device link enables use of resources on either the first storage device and the second storage device;
    exchanging configuration information of the first storage device and the second storage via the cross-device link;
    creating, in the first storage device, a shadow object corresponding to a real object in the second storage device; and creating, in the second storage device, a shadow object corresponding to a real object in the first storage device;
    receiving, at the first storage device, an input/output (I/O) request from a user;
    causing the first storage device to process the I/O request, if a target of the I/O request is a real object;
    causing the first storage device to redirect the I/O request to the second storage device, if a target of the I/O request is a shadow object, wherein the shadow object, as the target of the I/O request, corresponds to a real object in the second storage device; and
    if the I/O request is a write request, causing the first storage device to forward data to be written to the second storage device via the cross-device link, and causing the second storage device to process the I/O request and return processing result to the first storage device via the cross-device link, enabling the first storage device to return the processing result to the user;
    wherein each shadow object exposes at least one of a feature or a state of a corresponding real object to a user without implementing a functioning logic of the corresponding real object.

2. The method according to claim 1, the method further comprises:
    discovering a disk in either storage device of the first storage device and the second device, wherein both the first storage device and the second storage device contain disks, when at least one of:
    the either storage device boots from scratch or a new disk is added to the either storage device;
    creating a real object in the either storage device after discovering the disk, to track at least one of a disk configuration or the state of the either storage device;
    wherein exchanging configuration information of at least one of the first storage device and the second storage via the cross-device link comprises exchanging information of at least one of the disk configuration or the state of the either storage device.

3. The method according to claim 2, wherein the first storage device and the second storage device comprise storage arrays, and the real object includes at least one of the from the group consisting of:
    a Physical Drive Object (PDO);
    a Redundant Array of Independent Disk (RAID) Group (RG);
    a Logical Unit (LUN); and
    a volume of a disk.

4. The method according claim 1, the method further comprises:
    setting a storage processor (SP) of the first storage device and a corresponding SP of the second storage device as a remote peer SP of each other, wherein both the first storage device and the second storage device contain storage processors, wherein creating, in the first storage device, a shadow object comprises: creating a shadow object for a corresponding remote peer SP in the SP of the first storage device; and
    wherein creating, in the second storage device, a shadow object comprises: creating a shadow object for a corresponding remote peer SP in the SP of the second storage device.

5. The method according to claim 4, the method further comprises:
    detecting a peer status between an active SP of the first storage device and an active SP of the second storage device via the cross-device link, wherein both the first storage device and the second storage device contain active SPs.

6. The method according to claim 5, the method further comprises:
    promoting a passive SP of the at least one storage device to be a new active SP, when the active SP of the at least one storage device fails, wherein at least one storage device of the first storage device and the second device further comprises the passive SP.

7. The method according to claim 6, wherein setting a SP of the first storage device and a corresponding SP of the second storage device as a remote peer SP of each other comprises:
    setting an active SP of the first storage device and an active SP of the second storage device as a remote peer SP of each other, when both the first storage device and the second storage device comprises an available active SP;

setting both the active SP and the passive SP of the first storage device as remote peer SPs of the active SP of the second storage device, when the first storage device includes the available active SP and the passive SP and the second storage device comprises the available active SP; and setting the active SP of the first storage device and the active SP of the second storage device as a remote peer SP of each other and setting the passive SP of the first storage device and the passive SP of the second storage device as a remote peer SP of each other, when both the first storage device and the second storage device comprises the active SP and the passive SP.

8. The method according to claim 1, wherein causing the first storage device to redirect the I/O request to the second storage device comprises at least one of the followings:

if the I/O request is a read request, causing the first storage device to forward the I/O request to the second storage device via the cross-device link, and causing the second storage device to process the I/O request and return data to the first storage device via the cross-device link, enabling the first storage device to return data to the user.

9. The method according to claim 1, wherein the cross-device link is implemented by at least one of the Transmission Control Protocol and Internet Protocol (TCP/IP), Fast Communication Controller (FCC), INIFINIBAND and Peripheral Component Interconnect Express (PCI-E) protocols.

10. An apparatus for scaling out storage devices, the apparatus comprising computer-executable logic operating in memory, wherein the computer-executable program logic is configured to enable execution across one or more processors configured to:

establish a cross-device link between the first storage device and the second storage device, wherein the cross-device link enables use of resources on either the first storage device and the second storage device;

exchange configuration information of at least one of the first storage device and the second storage device via the cross-device link; and create, in the first storage device, a shadow object corresponding to a real object in the second storage device; and configured to create, in the second storage device, a shadow object corresponding to a real object in the first storage device;

receive, at the first storage device, an input/output (I/O) request from a user;

cause the first storage device to process the I/O request, if a target of the I/O request is a real object;

cause the first storage device to redirect the I/O request to the second storage device, if a target of the I/O request is a shadow object, wherein the shadow object, as the target of the I/O request, corresponds to a real object in the second storage device; and if the I/O request is a write request, cause the first storage device to forward data to be written to the second storage device via the cross-device link, and cause the second storage device to process the I/O request and return processing result to the first storage device via the cross-device link, enable the first storage device to return the processing result to the user;

wherein each shadow object exposes at least one of a feature or a state of a corresponding real object to a user without implementing a functioning logic of the corresponding real object.

11. The apparatus according to claim 10, further configured to:

discover a disk in either storage device of the first storage device and the second device, wherein both the first storage device and the second storage device contain disks, when at least one of the either storage device boots from scratch or a new disk is added to the either storage device;

create a real object in the either storage device after the discovery of the disk, to track at least one of a disk configuration or the state of the either storage device; and exchange information of at least one of the disk configuration or the state of the either storage device via the cross-device link.

12. The apparatus according to claim 11, wherein the first storage device and the second storage device comprise storage arrays, and the real object includes at least one of the followings:

a Physical Drive Object (PDO);
a Redundant Array of Independent Disk (RAID) Group (RG);
a Logical Unit (LUN); and
a volume of a disk.

13. The apparatus according to claim 10, further configured to:

set a Storage Processor (SP) of the first storage device and a corresponding SP of the second storage device as a remote peer SP of each other, wherein both the first storage device and the second storage device contain storage processors;

create, in the SP of the first storage device, a shadow object for a corresponding remote peer SP; and create, in the SP of the second storage device, a shadow object for a corresponding remote peer SP.

14. The apparatus according to claim 13, further configured to:

detect a peer status between an active SP of the first storage device and an active SP of the second storage device via the cross-device link, wherein both the first storage device and the second storage device contain active SPs.

15. The apparatus according to claim 14, further configured to:

promote a passive SP of the at least one storage device to be a new active SP, when the active SP of the at least one storage device fails, wherein at least one storage device of the first storage device and the second device further comprises the passive SP.

16. The apparatus according to claim 15, further configured to:

setting an active SP of the first storage device and an active SP of the second storage device as a remote peer SP of each other, when both the first storage device and the second storage device comprises an available active SP;

setting both the active SP and the passive SP of the first storage device as remote peer SPs of the active SP of the second storage device, when the first storage device includes the available active SP and the passive SP and the second storage device comprises the available active SP; and setting the active SP of the first storage device and the active SP of the second storage device as a remote peer SP of each other and setting the passive SP of the first storage device and the passive SP of the second storage device as a remote peer SP of each other, when both the first storage device and the second storage device comprises the active SP and the passive SP.

17. The apparatus according to claim 10, wherein causing the first storage device to redirect the I/O request to the second storage device comprises one of the following:

if the I/O request is a read request, causing the first storage device to forward the I/O request to the second storage device via the cross-device link, and causing the second storage device to process the I/O request and return data to the first storage device via the cross-device link, enabling the first storage device to return data to the user.

18. A computer program product comprising a non-transitory computer readable medium encoded with computer executable program code, wherein the code enables execution across one or more processors establishing a cross-device link between a first storage device and a second storage device, wherein the cross-device link enables use of resources on either the first storage device and the second storage device;

exchanging configuration information of the first storage device and the second storage via the cross-device link;

creating, in the first storage device, a shadow object corresponding to a real object in the second storage device; and creating, in the second storage device, a shadow object corresponding to a real object in the first storage device;

receiving, at the first storage device, an input/output (I/O) request from a user;

causing the first storage device to process the I/O request, if a target of the I/O request is a real object;

causing the first storage device to redirect the I/O request to the second storage device, if a target of the I/O request is a shadow object, wherein the shadow object, as the target of the I/O request, corresponds to a real object in the second storage device; and if the I/O request is a write request, causing the first storage device to forward data to be written to the second storage device via the cross-device link, and causing the second storage device to process the I/O request and return processing result to the first storage device via the cross-device link, enabling the first storage device to return the processing result to the user;

wherein each shadow object exposes at least one of a feature or a state of a corresponding real object to a user without implementing a functioning logic of the corresponding real object.

* * * * *